Figure 1:
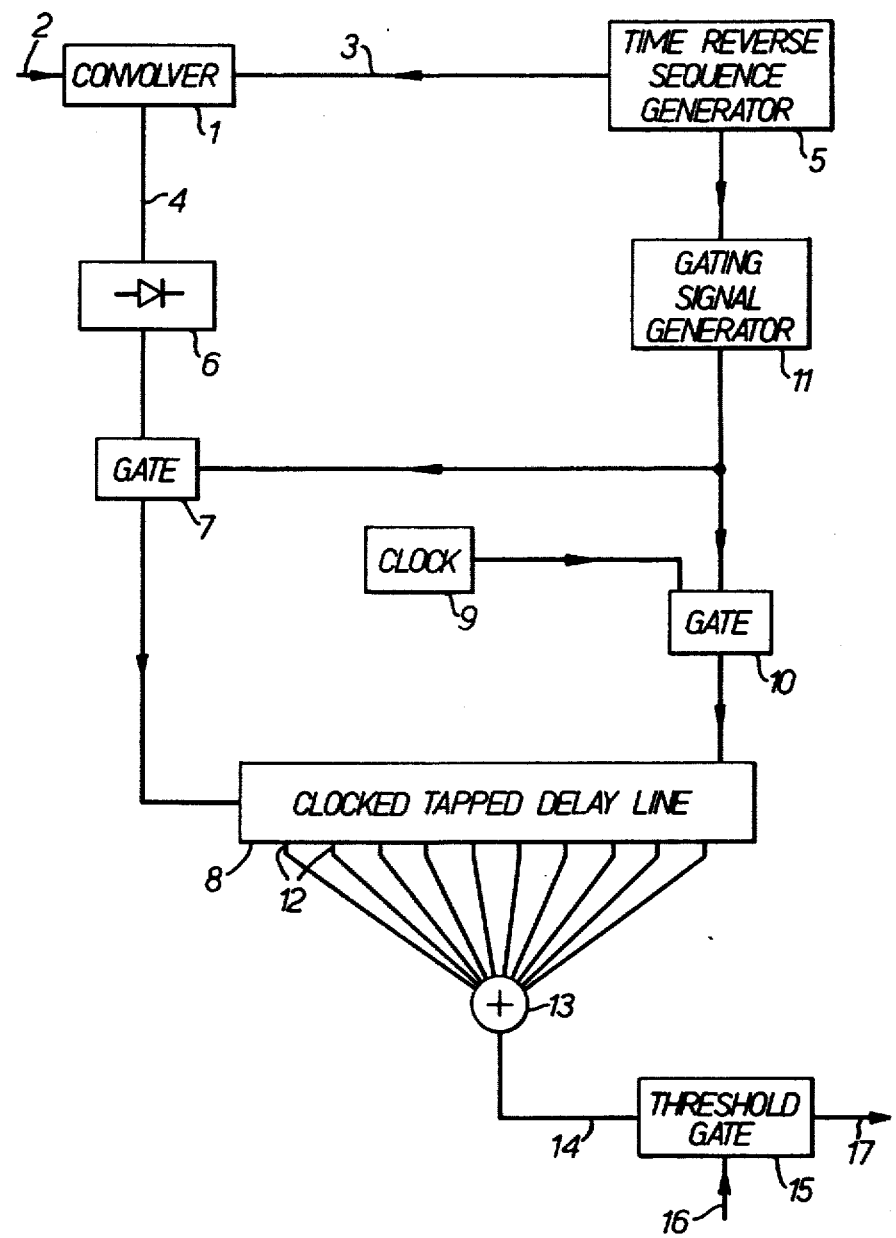

United States Patent [19]

Outram

[11] 4,300,235
[45] Nov. 10, 1981

[54] COMMUNICATIONS SYSTEMS
[75] Inventor: John D. Outram, Bognor Regis, England
[73] Assignee: Plessey Handel und Investments AG., Zug, Switzerland
[21] Appl. No.: 109,103
[22] Filed: Jan. 2, 1980
[30] Foreign Application Priority Data
 Jan. 3, 1979 [GB] United Kingdom ............... 00119/79
[51] Int. Cl.³ ............................................. H04K 1/04
[52] U.S. Cl. ........................................ 375/1; 375/14; 375/94
[58] Field of Search ............. 375/1, 34, 58, 80, 94–96, 375/103, 104, 115; 370/93; 364/572, 604, 728; 343/5 PN, 17.1 R; 329/104, 105

[56] References Cited
U.S. PATENT DOCUMENTS

| 3,648,237 | 3/1972 | Frey | 375/115 |
|---|---|---|---|
| 3,823,377 | 7/1974 | Keane | 370/107 |
| 3,906,496 | 9/1975 | Goodrich | 364/728 |
| 4,016,514 | 4/1977 | Reeder | 364/728 |
| 4,156,876 | 5/1979 | Debuisser | 364/728 |

*Primary Examiner*—Benedict V. Safourek
*Assistant Examiner*—Stephen Chin
*Attorney, Agent, or Firm*—Fleit & Jacobson

[57] ABSTRACT

A spread spectrum communication system comprising a convolver to one end of which a message is fed comprising a plurality of bits, the convolver being long enough in the direction of signal propagation therethrough to store contemporaneously two message bits each of which comprises a plurality of sub-bits or chips having a predetermined sequence, signal generator means operative to generate reference bits, at one to one mark space ratio, each reference bit comprising chips or sub-bits corresponding to the reverse of the said predetermined sequence, the generator means being arranged to feed the other end of the said convolver with the reference bits so that when a reference bit travelling in one direction passes a corresponding message bit travelling in the opposite direction a 'match' occurs and an output pulse is delivered from the convolver, gating means via which rectified output pulses from the convolver are fed to a clocked tapped analogue shift register or clocked tapped delay line means, a gating signal generator for producing a gating signal to which the gating means is responsive so that output pulses from the convolver produced during times when a reference bit is partly in or partly out of the convolver are not passed to the said analogue shift register or delay line means, a clock pulse generator to which the said analogue shift register or delay line means is responsive so that data from the convolver is clocked therethrough and further gating means via which signals from the clock pulse generator are applied to the clocked tapped analogue shift register or clocked tapped delay line means, said further gating means being responsive also to the gating signal or to a corresponding signal so that the clock pulses are not applied to the clocked tapped analogue shift register or clocked tapped delay line means, during those times when a reference bit is partly in or partly out of the convolver.

7 Claims, 8 Drawing Figures

COMMUNICATIONS SYSTEMS

This invention relates to spread spectrum communication systems.

Spread spectrum communication systems are well known and comprise means of spreading a transmitted signal spectrum over a relatively wide frequency band and accordingly means must be provided for despreading the received signal at the receiver. Spreading is achieved by means of a mixer effective to mix with the data signal for transmission, a signal code thereby to provide a spread spectrum signal which is transmitted. The despreading function is achieved by means of a mixer in which the received spread spectrum signal is mixed with a code signal which is identical to the code signal utilised for spreading purposes whereby an output signal from the mixer is provided in the receiver corresponding to the data signal transmitted.

The present invention is concerned especially with apparatus for performing the despreading function utilising a system in which the apparatus for generating the code signal in the transmitter is not sychronised with a generator for producing a corresponding code in the receiver and in which means must therefore be provided to effect message synchronization.

According to the present invention the receiver of a spread spectrum communication system comprises a convolver to one end of which a message is fed comprising a plurality of bits, the convolver being long enough in the direction of signal propagation therethrough to store contemporaneously two message bits each of which comprises a plurality of sub-bits or chips having a predetermined sequence, signal generator means operative to generate reference bits, at one to one mark space ratio, each reference bit comprising chips or sub-bits corresponding to the reverse of the said predetermined sequence, the generator means being arranged to feed the other end of the said convolver with the reference bits so that when a reference bit travelling in one direction passes a corresponding message bit travelling in the opposite direction a 'match' occurs and an output pulse is delivered from the convolver, a clocked tapped analogue shift register which may be analogue or digital or clocked tapped delay line means to which rectified output pulses from the convolver are fed, gating means, a clock pulse generator arranged to feed the said shift register or delay line means via the gating means, and a gating signal forming means responsive to the generator means for forming a gating signal which is applied to the gating means so that the clock pulses are not applied to the clocked tapped shift register or clocked tapped delay line means, during those times when a reference bit is partly in or partly out of the convolver.

Further gating means may be provided via which signals from the convolver are fed to the clocked tapped shift register or clocked tapped delay line means.

The clocked tapped delay line or clocked tapped shift register may be arranged to be long enough to hold a predetermined number of bits defining the message, the taps disposed thereon being positioned at points or locations which are spaced along the shift register so as to correspond with the spacing of the bits of the message.

The taps may be arranged to feed a summing device which will produce an output signal exceeding a predetermined threshold when the bits defining a message in the said register 'matches' the taps.

Output signals from the summing device may be fed to a threshold detector whereby messages which 'match' may be detected but alternatively output signals from the summing device may be processed in other ways.

Figure 2A:
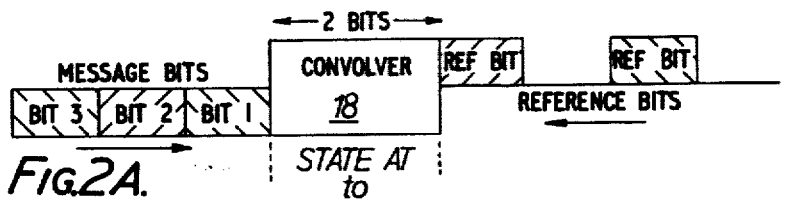
Figure 2B:
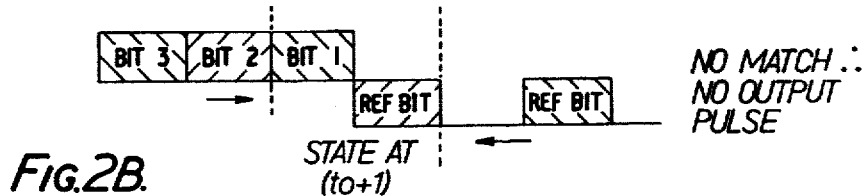
Figure 2C:
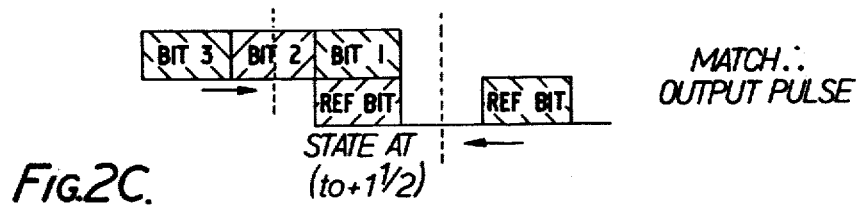
Figure 2D:
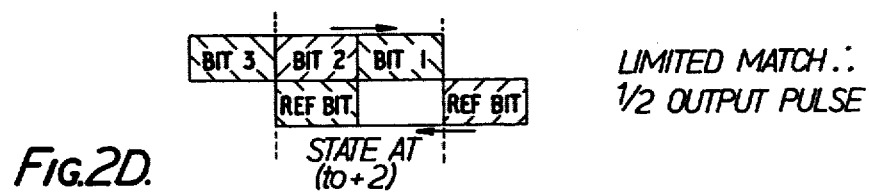
Figure 2E:
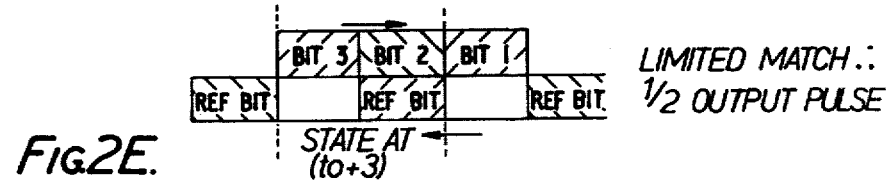
Figure 2F:
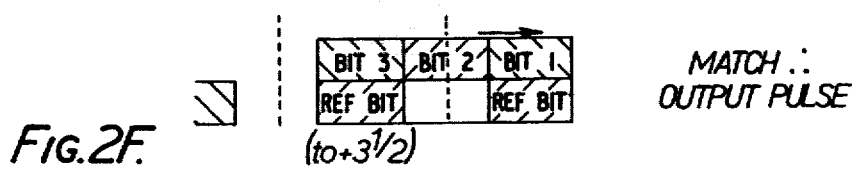
Figure 3:
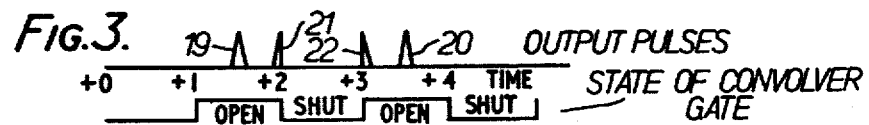

One embodiment of the invention will now be described by way of example with reference to the accompanying drawings in which:

FIG. 1 is a generally schematic block diagram of a part of a receiver of a spread spectrum communication system;

FIG. 2A-F is a generally schematic flow chart illustrating operation of the block diagram of FIG. 1; and FIG. 3 is a waveform diagram illustrating other aspects of the operation of the system described with reference to FIG. 1.

Referring now to FIG. 1, the receiver of a spread spectrum communication system comprises a convolver 1 to which a received spread spectrum input signal transmitted from a transmitter of the system is applied on line 2. The convolver comprises a S.A.W. (surface acoustic wave) device which can be fed from one end thereof via a line 2 and at the other end via line 3 to provide an output signal on a line 4. Operation of the convolver is such that if the input signal applied on the line 2 comprises a series of pulses and a similar series is applied in reverse on the line 3, then when the pulses of the two series occupy the same positions within the convolver a match can be said to have occured and an enlarged output signal pulse will obtain on the line 4. In the present system the convolver is arranged to be two bits long (that is long enough to contain contemporaneously two complete contiguous message bits) wherein each bit comprises a number of sub-bits or chips. The chips may be transmitted by any convenient modulation technique such as phase shift or frequency modulation. Bits may be transmitted at a rate of 1mhz say and there may be 20 chips/bit so that the chip rate is 20 mhz. A reference bit is produced by a time reverse sequence generator 5 which transmits reference bits spaced apart by an interval corresponding to one bit length so that the reference bits are transmitted with a one to one mark space ratio. Output pulses, which last for one chip duration only, since they only occur when the chips of a message bit match the chips of a reference bit, are fed via line 4 to a rectifier 6 which feeds a gate 7. The gate 7 is arranged to feed a clocked tapped analogue shift register 8 which may alternatively be a clocked tapped delay line. In an alternative embodiment the gate 7 may be omitted and signals from the rectifier 6 may be fed directly to the register 8. Data from the gate 7 is clocked into the shift register 8 by means of a high speed clock generator 9, which in the present case runs at 40 mhz but which in a general case should run at, at least twice the chip rate to satisfy sampling theory, and the generator 9 feeds the shift register 8 via an 'AND' gate 10. Pulses to operate the gate 7 and the 'AND' gate 10 are produced in a gating pulse generator 11, the pulses being fed to the gate 7 and the 'AND' gate 10 so that for the time during which a reference bit is being entered into the convolver 1 via line 3 and for the time during which a reference bit is effectively leaving the convolver the gate 7 is closed. It will be apparant that with a bit rate of 1 mhz the generator 11 will be arranged to produce pulses at 500 khz. During the time the gate 7 is closed the gate 10 is also closed and so therefore clock pulses are not during this time applied to the clocked tapped delay line or clocked tapped shift register 8. The reason for this latter gating procedure is important and will be described in detail with reference to FIGS. 2 and 3 but for the present the other parts of the system will be described.

The length of the clocked tapped delay line or clocked tapped analogue shift register 8 is determined in accordance with the message storage capability required. Taps 12 are arranged along the clocked tapped delay line or clocked tapped shift register so that the tapping points correspond to the spacing and order of the bits of a complete message, the spacing thereby representing the message bit sequence. Output signals from the taps are summed in a summing device 13 and an output signal from the summing device is fed via line 14 to a threshold gate 15. When a message within the clocked tapped delay line 'matches' the taps, an increase in output signal will be apparent on the line 14 and when the increase exceeds a threshold level which is defined by a signal applied on a line 16 to the threshold gate 15 the threshold gate 15 opens and an output signal is provided on output line 17, whereby synchronous signals on line 17 corresponding to signals transmitted are developed.

Operation of the convolver and the gates 7 and 10 will now be described in more detail with reference to FIGS. 2 and 3. Reference will firstly be made to FIG. 2 which is in effect a flow chart showing the position of message signals in relation to reference signals in a convolver shown schematically at 18. FIG. 2A shows the situation at time TO. Three contiguous message bits, bit 1, bit 2 and bit 3 are about to be progressively entered into the convolver 18 in the direction indicated by an arrow and at the same time reference bits having a 1:1 mark/space ratio are about to be entered into the convolver 18 from the opposite end of the convolver again in the direction indicate by an arrow.

FIG. 2B shows the situation after time TO+1 bit, and it can be seen that one message bit has entered into the convolver and one reference bit has also entered into the convolver but no overlapping of bits has occured.

After a further half bit, that is after time TO+1½ bits, a situation obtains as shown in FIG. 2C. It can be seen that at this time a reference bit is now matched with the messabe bit 1 and an output pulse will be delivered. This is because the chips of the reference bit occupy the same location as the chips of the message bit and a non linear and additive effect produces an output pulse whilst the match occurs.

After a further half bit, the situation is as shown in FIG. 2D at the time TO+2 bits. Here it can be seen that a reference bit now aligns and matches with the message bit 2 but, due to the fact that the gate 7 closes as the reference bit in effect begins to leave the convolver, approximately half an output pulse only will be produced.

The situation which obtains after time TO+3 is shown in FIG. 2E and it will be appreciated that the message bit 2 now aligns again with the reference bit at the other end of the convolver and an output pulse is produced but only for a short time after the gate 7 opens. Thus another half output pulse will be produced.

After a further half bit the situation will be as shown in FIG. 2F wherein it will be seen that the message bit 3 matches a reference bit in the center of the convolver and an output pulse is produced.

Referring now to FIG. 3 it will be seen that the output pulses as just before described with reference to FIG. 2 are produced at the times indicated, pulses 19 and 20 being complete pulses whereas pulses 21 and 22 are only part pulses which are clipped due to operation of the gate 7. The system thus far described has ignored operation of the gate 10 but it will be appreciated that since the clock is effectively stopped for the period during which the convolver gate is shut as shown in FIG. 3 then the part pulses 21 and 22 will in effect be brought together in the register 8 and anomalies which these part pulses could produce when split are obviated.

It will be appreciated by those skilled in the art that the system just before described facilitates message synchronisation in a spread spectrum communication system using an asynchronous convolver to achieve the de-spreading function. One important feature of the invention is the effective unravelling of non-linear time compression introduced in the convolver by operation of the gate 10 which effectively stops the clock during anomalous pulse registration period.

Another important feature is that the efficient use of a convolver which is facilitated in the present system enables the chips sequence to be changed easily. For example a plurality of chip sequences may be stored and selectively applied for despreading purposes. The system thus affords obvious advantages over corresponding systems utilizing a tapped delay line instead of a convolver wherein the chip sequences is fixed and easily determined by inspection of the delay line taps.

In an alternative embodiment of the invention a plurality of convolvers may be used simultaneously to despread a single input signal comprising a plurality of bits having different spreading characteristics.

What is claimed is:

1. The receiver of a spread communication system comprising a convolver to one end of which a message is fed comprising a plurality of bits, the convolver being long enough in the direction of signal propagation therethrough to store contemporaneously two message bits each of which comprises a plurality of sub-bits or chips having a predetermined sequence, signal generator means for generating reference bits at one-to-one mark-space ratio, each reference bit comprising chips or sub-bits corresponding to the reverse of the said predetermined sequence, the generator means being arranged to feed the other end of said convolver with the reference bits so that, when a reference bit travelling in one direction passes a corresponding message bit travelling in the opposite direction, a 'match' occurs and an output pulse is delivered from the convolver, a clocked tapped analogue delay line means for receiving rectified output pulses from the convolver, clock pulse generator means for providing clock pulses, gating means between said clock pulse generator means and said clocked tapped delay line means for selectively providing or not providing said clock pulses to said clocked tapped delay line means, and gating signal forming means responsive to the generator means for forming a gating signal which is applied to the gating means so that the clock pulses are not applied to the clocked tapped delay line means during those times when a reference bit is partly in or partly out of the convolver.

2. A receiver as claimed in claim 1 comprising further gating means via which signals are fed from the convolver to the clocked tapped analogue delay line means.

3. A receiver as claimed in claim 1 wherein the clocked tapped delay line means is arranged to be long enough to hold a predetermined number of bits defining the message, the taps disposed thereon being positioned at points or locations which are spread along the delay line means so as to correspond with the spacing of the bits of the message.

4. A receiver as claimed in claim 2, wherein the taps are arranged to feed a summing device which is arranged to produce an output signal exceeding a predetermined threshold level when the bits defining a message in the said delay line means match the taps.

5. A receiver as claimed in claim 3, comprising a threshold detector fed from the summing device whereby messages which 'match' are detected when the output signal exceeds the predetermined threshold level.

6. A spread spectrum communication system comprising at least one receiver as claimed in any one of claims 1, 2, 3, 4, or 5.

7. A receiver as claimed in claim 1, wherein said clocked tapped delay line means comprises a clocked tapped analogue shift register.

* * * * *